May 1, 1951  A. A. LAMBERT, JR  2,551,495
AIRCRAFT CONTROL SURFACE BALANCE MEANS
Filed June 14, 1944  2 Sheets-Sheet 1

Aileron Operating Force in Lbs.

Aileron Deflection in Deg.

INVENTOR.
ARTHUR A. LAMBERT, JR.
BY
Beau, Brooks, Buckley • Beau.

INVENTOR.
ARTHUR A. LAMBERT, JR.

Patented May 1, 1951

2,551,495

UNITED STATES PATENT OFFICE 2,551,495

AIRCRAFT CONTROL SURFACE BALANCE MEANS

Arthur A. Lambert, Jr., Niagara Falls, N. Y., assignor to Bell Aircraft Corporation, Buffalo, N. Y.

Application June 14, 1944, Serial No. 540,176

10 Claims. (Cl. 244—90)

This invention relates to aircraft flight control means, and more particularly to improvements in aerodynamically balanced movable control surfaces for high speed airplanes and the like. As used herein, the term "movable control surface" refers to any airstream-adjustable devices such as may be employed to control the flight of an aircraft; such as ailerons, elevators, rudders, and the like.

It is now well known in the aeronautical art that control surfaces such as are hereinabove referred to may desirably be aerodynamically balanced for the purpose of providing automatic assistance toward deflections of such surfaces against the forces of the relative airstream away from their neutral positions, thus partially relieving the surface control system of loads which would be otherwise imposed thereon in order to obtain the necessary degrees of deflection of the control surfaces for flight control purposes. With this object in mind numerous prior art arrangements have been devised with a view to employing aerodynamic pressure differentials to act against accessory portions of the control surface to be "balanced" so that force moments about the movable surface hinge axis are automatically developed in opposition to the force moments generated by the airstream resistance to deflection movements of the control surface away from neutral trailing positions.

Such prior art arrangements are disclosed, for example, in U. S. Patents 2,211,870; 2,239,475; and 2,281,696; and such patents disclose the use of an airtight partition or membrane to extend from the nose of a movable control surface into air-sealing relation with the rear wall of a stationary wing housing or the like into which the nose of the control surface is nested, whereby to divide the space interiorly of the housing into a pair of air pressure chambers above and below the "balancing" partition. These air chambers are arranged to be in open communication with the atmosphere externally of the airfoil unit by means of slot-like openings extending along the upper and lower surfaces thereof in the region of the junctions of the skin structures of the fixed and movable airfoil elements. Thus, while deflection of the control surface away from its neutral position results in generation of increased dynamic pressure forces acting directly against the surface portion so projected into the airstream and decreased dynamic pressure forces at the opposite side of the control surface, the airstream flow will be thereby so affected that pressure changes will occur in the upper and lower air chambers of the fixed airfoil compartment by transmission of air through the slotted openings. The parts are so arranged that this change of pressures interiorly of the airfoil will act upon the balancing partition so as to provide a force composition assisting in rotation of the control surface in the desired deflected direction.

Thus, by such arrangements the desired object of diminishing the control forces required to deflect the control surface may be attained; but I have determined that such prior art arrangements are subject to certain serious difficulties and disadvantages. For example, it has been determined that such "air-tight" balancing partition arrangements of the prior art cannot be effectively provided to consistently obtain properly balancing effects because if such arrangements are constructed in accord with designs to provide adequate "balancing" at relatively high deflections of the control surface, they will tend to produce over-balancing at small deflection positions of the control surface. Such effects as this are highly undesirable and objectionable to the pilot, for example, because under such conditions the pilot control stick will not naturally center itself to a zero control surface deflection, and therefore the airplane will not tend to fly level and straight with the control stick free. Also, the "over-balance" effect referred to hereinabove gives the pilot a feeling of airplane instability. Therefore, it will be understood that such prior art arrangements do not always provide satisfactory and complete solutions of the stated problem, and a primary object of the present invention is to provide an improved aerodynamically balanced control surface arrangement which avoids and eliminates the difficulties and disadvantages referred to hereinabove. More specific objects and advantages of the invention will appear in the specification hereinafter.

Figure 1:
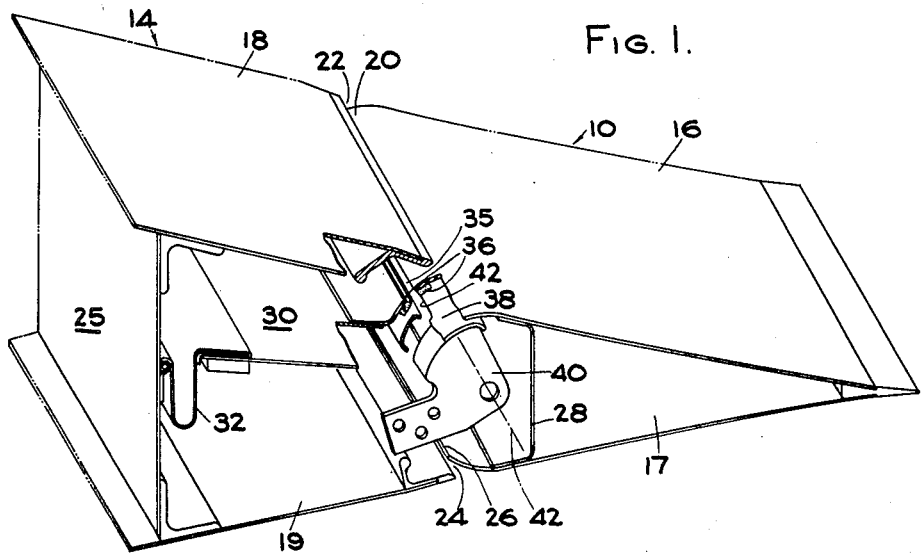
Fig. 1 is a fragmentary perspective of an airplane fixed airfoil and a hinged control surface trailing the fixed airfoil, with parts broken away to show an aerodynamic balance control means of the invention.

As shown in Fig. 1, the invention may be employed to provide controlled balance of a movable control surface 10 which may be an aileron or elevator or rudder or the like carried by means of a hinge connection to be rotatable about a hinge axis 12 at the rear of another airfoil structure 14 which may comprise either a fixed wing or horizontal or vertical fin, or the like. Thus, it will be understood that the control surface 10 will include upper and lower skin surfaces 16—17 so arranged as to provide substantially smooth continuations of the corresponding skin surface portions 18—19 of the fixed airfoil structure whenever the control surface 10 is trailing the fixed airfoil in substantially neutral position. As shown at 20, the nose portion of the control surface 10 will be formed to curve concentrically of the hinge axis 12 and disposed to extend into the space between the trailing edge portions of the airfoil skin members 18—19. The control surface 10 will be so positioned relative to the airfoil 14 as to provide air slots 22—24 in the region of the junctures of the upper and lower skin elements, respectively, so as to provide air passageways therebetween leading from above and below the unit into the interior of the trailing edge portion of the fixed airfoil and ahead of the movable airfoil 10. A transverse wall 25 extending between the airfoil skin elements 18—19 in air-tight connected relation provides the front wall of the air chamber interiorly of the fixed airfoil 14. The lower front portion of the control surface skin element 17 is cut away as at 26 and a wall plate 28 extends transversely of the skin elements 16—17 so as to provide an air chamber interiorly of the trailing edge of the fixed airfoil 14 and of the leading edge of the control surface 10, which chamber is substantially closed except for the slots 22—24 leading thereinto.

A partition plate 30 is fixed to the nose of the control surface 10 above the cut away portion 26 thereof to extend integrally therewith and forwardly therefrom toward the fixed airfoil wall 25; and in order to effectively air-seal the partition plate 30 relative to the fixed wall 25 under all conditions of control surface deflection a flexible fabric 32 or the like is connected to extend in air-sealing relation across the gap between the end of the plate 30 and a vertically midportion of the wall 25. Thus, the fabric 32 will provide no interference with movements of the partition 30 relative to the plate 25 while maintaining an effective air-seal therebetween.

To provide the controlled balance feature of the invention the upper portion of the nose of the control surface 10 is slotted as indicated at 35 parallel to the hinge axis 12, and is preferably fitted at opposite sides of the slot and under the skin portions thereof with resilient air-seal strippings 36—36. Thus, the slot 35 provides for open communication between the interior of the nose of the control surface 10 and both portions of the air chamber within the fixed airfoil above and below the balance plate 30 for equalization of pressure differentials thereagainst. A control plate 38 is carried by means of bracket devices as at 40 to extend lengthwise of the slotted formation 35 of the control surface nose, and the control plate 38 is sectionally curved concentrically of the curve of the slotted nose portion of the control surface 10, and is also formed with a slotted formation 42. Thus, it will be understood that upon rotation of the control surface 10 about the hinge axis 12 the slotted portion 35 of the control surface will be oscillated relative to the slotted portion 42 of the fixed control plate 38, thus providing a metering action regulating the degree of "leakage" of air around the "balance" plate 30.

Thus, it will be understood that an arrangement is provided whereby variable degrees of air pressure differential equalizing leakages around the balancing plate are provided, and that maximum leakage is permitted at neutral or low angle of deflection positions of the control surface, while at high deflections of the control surface to either side of its neutral position the valving device permits increasingly reduced, and ultimately no leakage. Hence, at high deflections of the control surface maximum dynamic balancing operations of the partition 30 are permitted, while at neutral or low deflection positions of the control surface the balancing tendencies of the plate 30 are reduced by the action of the valving mechanism; whereby under all conditions of control surface deflection only the desired degree of dynamic balancing is experienced.

Figure 2:
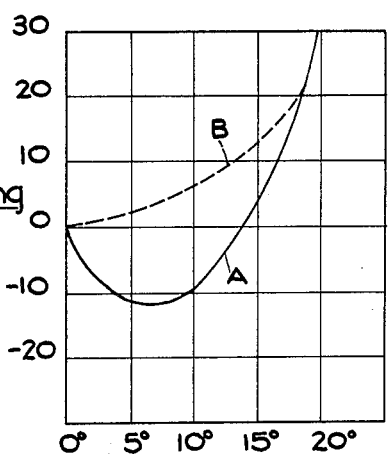
Fig. 2 is a graph comparatively illustrating control operating loads in connection with balanced aileron arrangements of the prior art and of the present invention.

For example, as shown graphically in Fig. 2, the curve A illustrates a typical diagram of control forces required in connection with aileron deflections in the case of a conventional dynamically balanced aileron arrangements of the prior art; while curve B provides a diagram of the control forces required to actuate a similar aileron incorporating the balance control feature of the present invention. It will be seen from this graph that in the case of the present invention the control system is stable under low deflection conditions, whereas the prior art arrangement provides instability under similar conditions; and that the arrangement of the present invention provides at least equally beneficial balancing effects at high angles of deflection.

Figure 3:
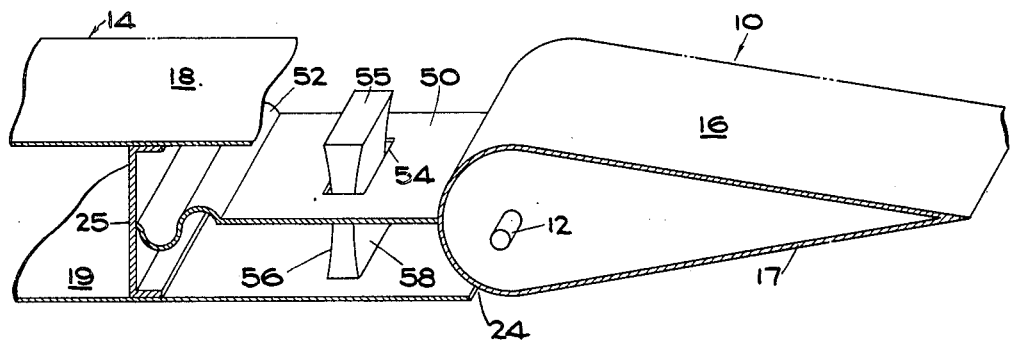
Figs. 3 and 4 are fragmentary perspectives, with portions cut away, to show other forms of balance control means of the invention.

Fig. 3 illustrates more or less diagrammatically another form of balance control valve device of the invention wherein the movable control surface 10 carries a balance plate 50 which is air-sealed to the fixed airfoil wall 25 by means of a flexible fabric 52. The balance plate 50 is apertured at 54 to accommodate a valve device 55 which is in the form of a block extending vertically and transversely through the apertured portion 54 of the balance plate. The block 55 is curved at its sides 56—58 so as to provide air transmission gaps between the balance plate 50 and the valve block 55; the air gaps so provided being of varying widths depending upon the angular deflection positions of the control surface 10. Thus, as shown in the drawing, the block 55 is of larger thickness dimensions at its upper and lower ends, whereby whenever the control surface 10 is deflected to major degrees into the relative airstream the air leakage gaps through the partition plate 50 will be either of reduced size or completely closed, as may be required to provide the preferred type of control surface balancing; whereas whenever the control surface 10 is in neutral or only slightly deflected attitudes the air leakage gaps around the control block 55 are open so as to prevent "over balancing" effects as explained hereinabove.

Figure 4:
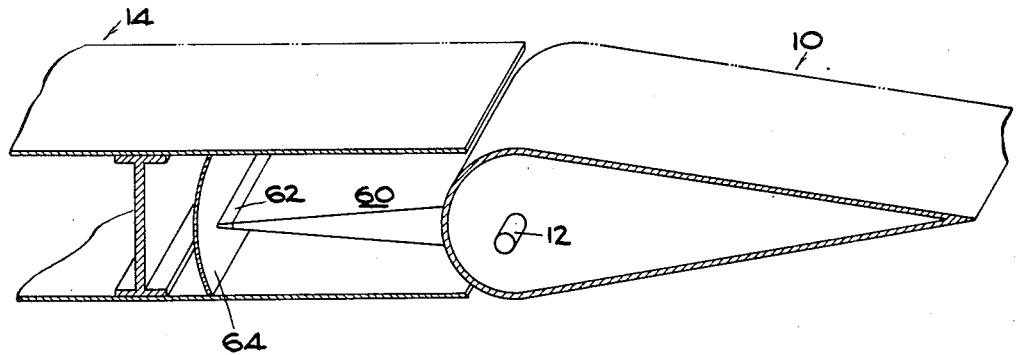

Fig. 4 illustrates another arrangement for providing variable "leakages" of air relative to the balance plate 60 of the movable control surface 10. In this case the leading edge of the balance plate 60 is preferably provided with a resilient wiper element 62 which is adapted to slide in air-sealing relation against the upper and lower portions of a curved wall plate 64 constituting the back wall of the air pressure chamber interiorly of the fixed airfoil structure 14. The plate 64 is curved to a sharper radius than that of the arc of movement of the leading edge 62 of the balance plate, so that whenever the control surface 10 is in neutral or slightly deflected positions there is an appreciable air leakage gap between the curved plate 64 and the leading edge of the balance plate 60; thereby permitting equalization of air pressure forces at opposite sides of the balance plate as explained hereinabove. However, upon movements of the control surface 10 to major degrees of deflection, the leading edge portion 62 thereof will be moved into increasingly closer relation with respect to the curved plate 64, whereby to reduce the size of the air leakage slot therebetween and to ultimately eliminate air leakage effects as the control surface 10 finally reaches positions requiring full dynamic balancing forces for optimum pilot-operation of the aircraft.

I claim:

1. An airfoil, a control surface forming a trailing portion of said airfoil and mounted for angular movement relative thereto for control, said airfoil providing a space therewithin and having a forwardly bulging forward wall, the leading edge portion of said control surface extending forwardly into and through said space to substantially divide the same into separate chambers at opposite sides of said leading edge portion, said separate chambers being in communication with the exterior of the airfoil at opposite sides thereof, respectively, whereby there is established in each chamber an air pressure condition corresponding to the air pressure condition at the side of the airfoil with which said chamber is in communication, said leading edge portion of the control surface being subjected to differences in pressure in the chambers at opposite sides thereof, said forward wall being so disposed relative to said leading edge portion and being so formed as to permit passage of air therearound to affect the pressure differential at opposite sides thereof, said forward wall having a central portion with a radius of curvature less than that of the arc described by said leading edge portion adjacent to said wall as said leading edge portion moves angularly, whereby said forward wall and said leading edge portion are so formed and arranged as to provide increased throttling of the air passing around said leading edge portion as said control surface is moved to increased angular positions relative to said airfoil, so as to provide minimum pressure differential forces under control surface zero deflection conditions and increasingly effective pressure differentials under increased control surface deflection conditions.

2. In an aircraft, a flight control unit comprising a fixed airfoil having a rearwardly open housing, a movable airfoil having its nose portion nested within said fixed airfoil housing, said nose portion being formed with an elongated slot extending normal to the flight axis of said aircraft, means mounting said movable airfoil so as to be pivotable relative to said fixed airfoil while the skin surfaces of said movable airfoil are so disposed as to form substantial continuations of corresponding skin surfaces of said fixed airfoil but to be spaced therefrom so as to provide air transmission gaps leading into the interior of said fixed airfoil housing ahead of the nose portion of said movable airfoil and at opposite sides thereof, means for aerodynamically balancing said movable airfoil comprising a balance device extending from said movable airfoil and integrally therewith in a direction generally parallel to said movable airfoil to partition said fixed airfoil housing into a pair of walled chambers and to receive dynamic air pressure force differentials at opposite sides thereof to assist controlled deflections of said movable airfoil into the relative airstream, and a control plate fixed to the fixed airfoil structure and in overlapped relation with said nose portion, said plate being formed with an elongated opening normal to the flight axis of the aircraft, the openings in said plate and said nose portion being in registration when said movable airfoil is in a position of zero deflection, the effective opening between said plate and said nose portion being increasingly throttled as said movable airfoil is operated to increasingly deflected positions.

3. An airfoil, a control surface forming a trailing portion of said airfoil and mounted for angular movement relative thereto for control, said airfoil providing a space therewithin having a forward wall, the leading edge portion of said control surface extending forwardly into and through said space to substantially divide the same into separate chambers at opposite sides of said leading edge portion, said separate chambers being in communication with the exterior of the airfoil at opposite sides thereof, respectively, whereby there is established in each chamber an air pressure condition corresponding to the air pressure condition at the side of the airfoil with which said chamber is in communication, said leading edge portion of the control surface being projected toward said wall and in spaced relation therewith, and said wall having a curvature radius shorter than the radius of pivoting of the adjacent portion of said leading edge.

4. In an aircraft, a flight control unit comprising a fixed airfoil having a rearwardly open housing, a movable airfoil having its nose portion nested within said fixed airfoil housing, means mounting said movable airfoil so as to be pivotable relative to said fixed airfoil while the skin surfaces of said movable airfoil are so disposed as to form substantial continuations of corresponding skin surfaces of said fixed airfoil but to be spaced therefrom so as to provide air transmission gaps leading into the interior of said fixed airfoil housing ahead of the nose portion of said movable airfoil and at opposite sides thereof, means for aerodynamically balancing said movable airfoil comprising a plate carried by said movable airfoil in a direction generally parallel to said movable airfoil and extending into said fixed airfoil and thereby providing two air chambers, said plate having an air passage aperture to provide communication between said chambers, and a block of varying sectional dimensions carried by said fixed airfoil to extend through the aperture of said plate, said block being so formed and arranged so as to provide increasingly throttling of the air passage aperture between chambers when said movable airfoil is pivoted from neutral position toward its increasingly deflected positions.

5. In an aircraft, a flight control unit comprising a fixed airfoil having a rearwardly open housing, a movable airfoil having its nose portion nested within said fixed airfoil housing, means mounting said movable airfoil so as to be pivotable relative to said fixed airfoil while the skin surfaces of said movable airfoil are so disposed as to form substantial continuations of corresponding skin surfaces of said fixed airfoil but to be spaced therefrom so as to provide air transmission gaps leading into the interior of said fixed airfoil housing ahead of the nose portion of said movable airfoil and at opposite sides thereof, means for aerodynamically balancing said movable airfoil comprising a balance device extending from said movable airfoil in a direction generally parallel thereto and integrally therewith to partition said fixed airfoil housing into a pair of walled chambers and to receive dynamic air pressure force differentials at opposite sides thereof to assist controlled deflections of said movable airfoil into the relative airstream, and a balance operation control means comprising an air throttling valve means controlling fluid flow between the said chambers and operated by movement of said movable airfoil and consisting of relatively movable valve elements forming an aperture of maximum size in a central relative position of said elements and the neutral position of said movable airfoil and progressively decreasing size in oppositely displaced positions from said central position; one of said elements being fixed to said fixed airfoil; the other of said elements being integral with said movable airfoil, whereby the said dynamic air pressure is bled through the said valve means for reduced balancing force at small deflections of said movable airfoil and said bleeding is progressively less at increasingly larger deflections for increased balancing forces.

6. In an aircraft, a flight control unit comprising a fixed airfoil having a rearwardly open housing, a movable airfoil having its nose portion nested within said fixed airfoil housing, means mounting said movable airfoil so as to be pivotable relative to said fixed airfoil while the skin surfaces of said movable airfoil are so disposed as to form substantial continuations of corresponding skin surfaces of said fixed airfoil but to be spaced therefrom so as to provide air transmission gaps leading into the interior of said fixed airfoil housing ahead of the nose portion of said movable airfoil and at opposite sides thereof, means for aerodynamically balancing said movable airfoil comprising a balance device extending from said movable airfoil in a direction generally parallel thereto and integrally therewith to partition said fixed airfoil housing into a pair of walled chambers and to receive dynamic air pressure force differentials at opposite sides thereof to assist controlled deflections of said movable airfoil into the relative airstream, and a balance operation control means comprising an air throttling valve means controlling fluid flow between the said chambers and operated by movement of said movable airfoil and consisting of relatively movable valve elements forming an aperture of maximum size in a central relative position of said elements and the neutral position of said movable airfoil and progressively decreasing size in oppositely displaced positions from said central position, means connecting one of said elements to said fixed airfoil, means connecting the other of said elements with said movable airfoil, whereby the said dynamic air pressure is bled through the said valve means for reduced balancing force at small deflections of said movable airfoil and said bleeding is progressively less at increasingly larger deflections for increased balancing forces.

7. In an airplane, the combination of: a fixed surface having a rearwardly located, rearwardly opening chamber therein communicating with the airstream; a control surface hingedly associated with said fixed surface and having a portion extending forwardly into said chamber ahead of its hinge axis; a pressure seal extending between said extended portion and the forward wall of said chamber, said extended portion having at least one orifice establishing aerodynamic communication therethrough; and orifice closure members respectively mounted on the upper and on the lower boundaries of said chamber in arcuate registration with the path of movement of said orifice.

8. In an airplane having a fixed surface and a control surface hingedly mounted thereon rearwardly thereof, said control surface being subject to variations in air-loading originating in changes in the deflection of said surface, means for accommodating the control surface operating forces to said variations, comprising: a rearwardly located, rearwardly opening chamber in said fixed surface communicating with the airstream, said chamber having a forward wall; a nose portion on said control surface extending forwardly into said chamber ahead of the hinge axis; a pressure seal extending between said nose portion and the forward wall of said chamber; and means separate from said pressure seal including a first member fixed with respect to said chamber; a second member carried by the forward extension of said nose portion and constrained to move with respect to the first member to provide within the confines of the forward extension of said nose portion a variable area orifice extending through said forward extension, said second member being constrained to move closer toward said first member in response to deflections of said surface toward its extremes so as to constrict said orifice and thereby prevent pressure equalization on opposite faces of said nose portion and augment the effectiveness of the pilot's forces and being constrained to move away from said first member in response to movements of said control surface away from its extreme deflected positions to enlarge said orifice as said deflections approach the minimum, thereby to establish equal pressures on opposite faces of said nose portion and preserve the natural "feel" of said control surface in and near its neutral position.

9. In an airplane, the combination of: a fixed surface having a rearwardly located, rearwardly opening chamber therein communicating with the airstream; a control surface hingedly associated with said fixed surface and having a portion extending forwardly into said chamber ahead of its hinge axis; a pressure seal extending between said extended portion and the forward wall of said chamber, said extended portion having at least one orifice establishing aerodynamic communication therethrough; and valve means including orifice closure portions disposed respectively in the upper and lower boundaries of said chamber in arcuate registration with the path of movement of said orifice.

10. In an airplane having a fixed surface and a control surface hingedly mounted thereon rearwardly thereof, said control surface being subject to variations in air-loading originating in changes in the deflection of said surface, means for accommodating the control surface operating forces to said variations, comprising: a rearwardly located, rearwardly opening chamber in said fixed surface communicating with the airstream, said chamber having a forward wall; a nose portion on said control surface extending forwardly into said chamber ahead of the hinge axis; a pressure seal extending between said nose portion and the forward wall of said chamber; and means including a first member fixed with respect to said chamber and orifice means movable with respect to the first member and cooperating therewith to provide at least one orifice having a variable effective area and flow-connecting the opposite faces of said nose portion; said orifice means being constrained to move closer toward said first member only in response to movements of said control surface toward its extreme deflections from neutral sufficiently to constrict said orifice and thereby to prevent equalization of pressures on opposite faces of said nose portion and augment the effectiveness of the pilot's forces, and being constrained to move farther away from said first member in response to movements of said control surface away from its extreme deflected positions to enlarge said orifice as said deflections approach the minimum; thereby to establish equal pressures on opposite sides of said nose portion and preserve the natural "feel" of said control surface in and near its neutral position.

ARTHUR A. LAMBERT, Jr.

REFERENCES CITED

The following references are of record in the file of this patent:

FOREIGN PATENTS

| Number | Country | Date |
|---|---|---|
| 491,538 | Great Britain | Sept. 5, 1938 |